United States Patent [19]
Shannon et al.

[11] Patent Number: 5,663,012
[45] Date of Patent: Sep. 2, 1997

[54] APPARATUS FOR GANG-CONNECTING BATTERIES

[75] Inventors: John K. Shannon; James M. Shannon, both of Racine, Wis.

[73] Assignee: Enersafe Corporation, Racine, Wis.

[21] Appl. No.: 400,711

[22] Filed: Mar. 8, 1995

[51] Int. Cl.⁶ .............................. H01M 2/20; H01R 11/00
[52] U.S. Cl. .......................... 429/121; 429/123; 439/504
[58] Field of Search ........................... 429/123, 1, 161, 429/158, 121, 122; 439/232, 268, 295, 436–441, 500, 504, 510–512, 754–774, 842, 157

[56] References Cited

U.S. PATENT DOCUMENTS

| | | | |
|---|---|---|---|
| 4,084,037 | 4/1978 | Morton | 429/1 |
| 4,130,336 | 12/1978 | Dozier | 439/436 |
| 4,797,113 | 1/1989 | Lambert | 439/74 |
| 4,836,798 | 6/1989 | Carter | 439/268 |
| 5,104,752 | 4/1992 | Baughman et al. | 429/123 X |
| 5,378,552 | 1/1995 | Dixon, Jr. | 429/123 X |

*Primary Examiner*—Anthony Skapars
*Attorney, Agent, or Firm*—Jansson & Shupe, Ltd.

[57] ABSTRACT

A battery connection apparatus for gang-connecting batteries together includes a terminal on a battery and a connector coupled to the terminal. The connector and terminal are resiliently snap-fitted to one another. The apparatus employs what may be termed a "ball-and-socket" arrangement in which a male portion (whether on the battery or on the connector) snap-fits into a female portion. Resiliency is provided by "springy" split finger pieces or by a compressed resilient core-like component. Using the new apparatus, batteries may be gang-connected horizontally or vertically and, essentially, without the use of tools.

6 Claims, 7 Drawing Sheets

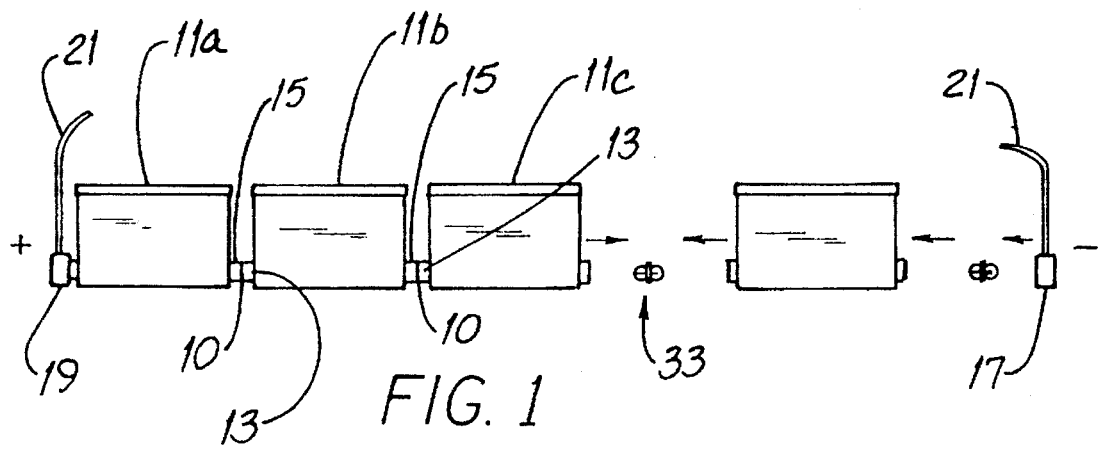
FIG. 1
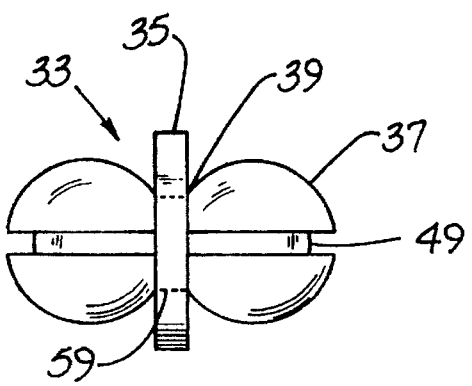
FIG. 9
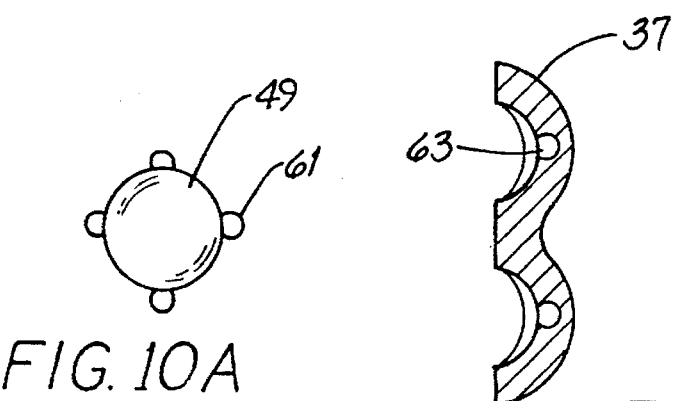
FIG. 10A
FIG. 10B

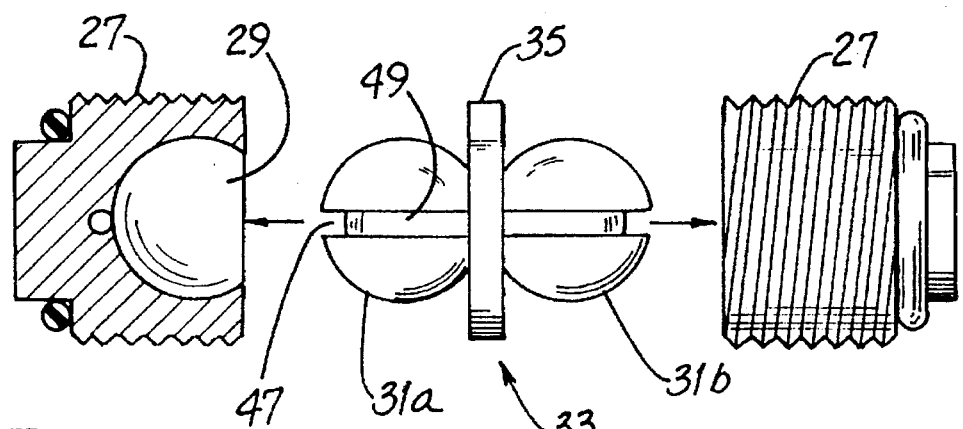
FIG. 4
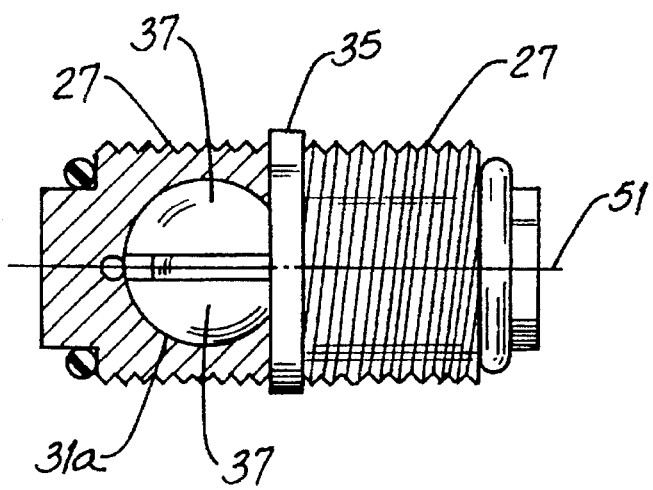
FIG. 5
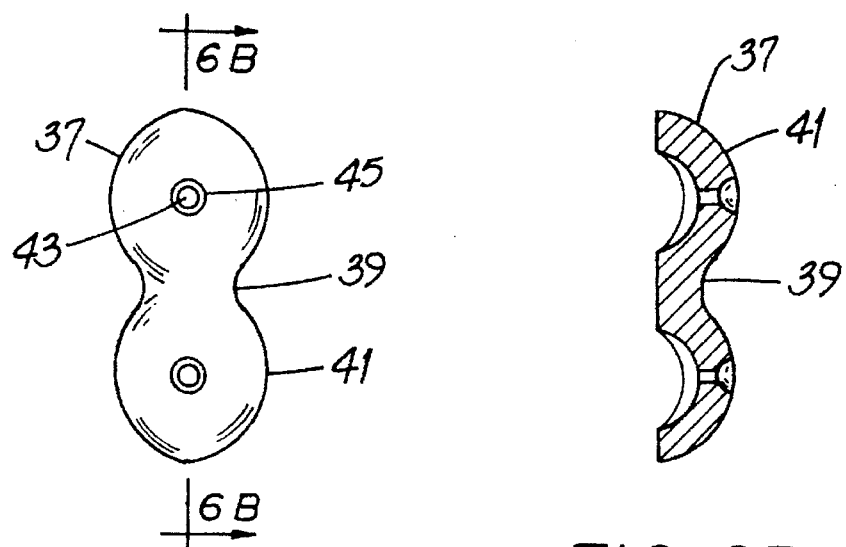
FIG. 6A
FIG. 6B

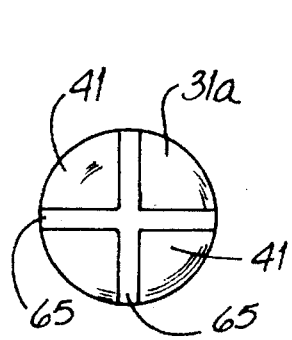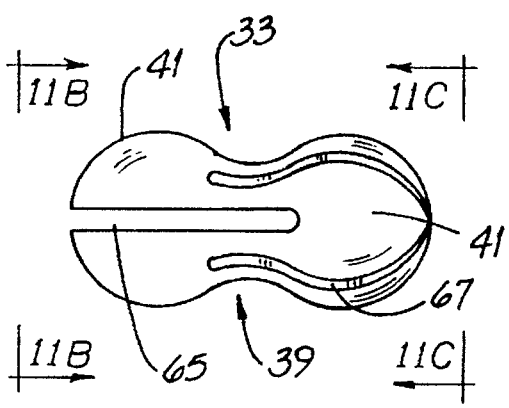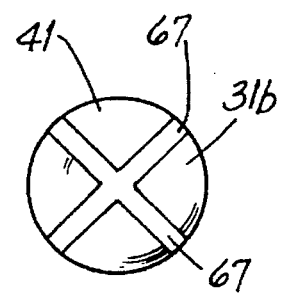
FIG. 11B  FIG. 11A  FIG. 11C
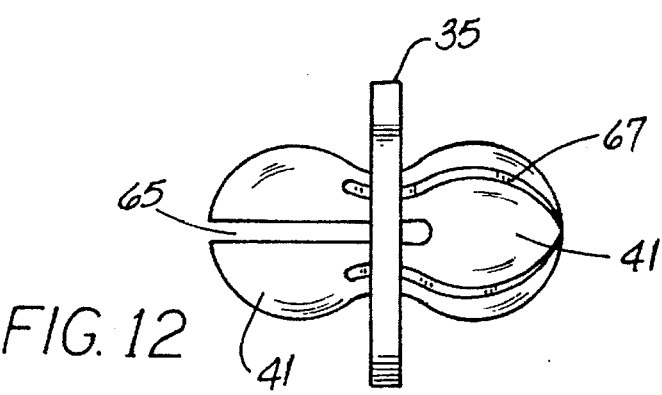
FIG. 12
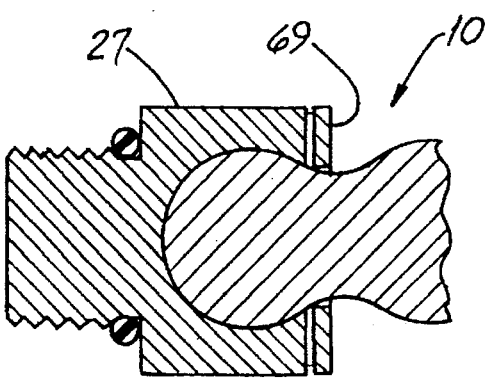
FIG. 13A
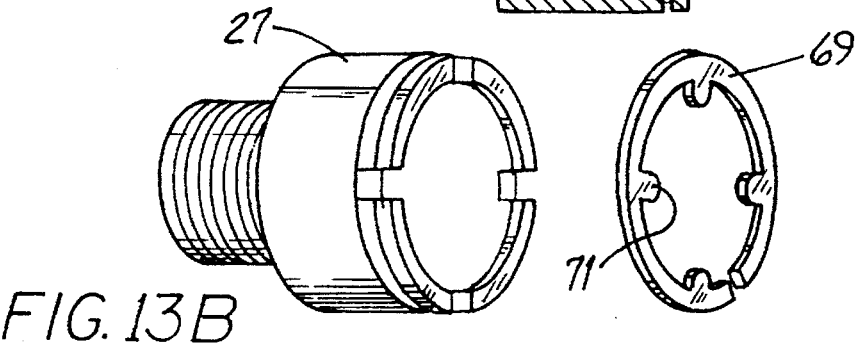
FIG. 13B

APPARATUS FOR GANG-CONNECTING BATTERIES

FIELD OF THE INVENTION

This invention relates generally to electricity and, more particularly, to electrical storage batteries.

BACKGROUND OF THE INVENTION

Electrical storage batteries, whether of the paste, gelled or liquid electrolyte type, have been in use for decades. And at least in the case of lead-acid batteries as used in motor vehicles, golf carts, wheel chairs, stand-by power supplies and the like, the batteries are often interconnected to one another. Such "ganging" of batteries (whether in series, in parallel or both) is to obtain higher voltage and/or higher current capability. For example, two 12 volt batteries connected in series provide 24 volts across the pair.

Very commonly, such batteries are ganged together using a cable which includes a length of stranded, "rope-like" wire with a metal connector (of the clamping or bolt-on type) at each end. When connecting batteries in series, such cable is used to attach the "positive" or "+" terminal of one battery to the "negative" or "−" terminal of the other.

The interconnecting cable must be sufficiently long, e.g., six to ten inches or more depending upon battery size, to effect easy interconnection. And for a given current-carrying capacity, the cross-sectional area of the stranded wire needs to be increased in longer cables. Such increase in area (and consequent increase in cost) maintains resistivity per unit length at an acceptable level.

Yet another fact impacting the cost and resistivity of conventional interconnection cables involves attachment of metal connectors to the stranded wire. Such attachment has adverse implications for labor and material cost and results in a wire-connector joint. In an arrangement involving conventional cable interconnecting two batteries, there are four joints, one each at the two battery terminals and one at each of the two junctions of the wire and the connectors. Each joint in a battery circuit presents another opportunity for corrosion and increased circuit resistance.

Often, the metal battery terminals to which connections are made are not insulated or are not fully insulated. The same may be said for the metal connectors at the ends of the connector cable. Therefore, in a ganged group of batteries providing relatively high voltage across the output terminals, the exposed metal parts (battery terminals, connectors and even short lengths of cable) can present a shock hazard. The risk of such hazard increases with increasing voltage. Battery arrays which produce 480 volts are not uncommon And the battery connection "hardware" is not the only aspect of concern with batteries, whether ganged or otherwise. Installation and maintenance of the inter-battery connections requires tools and such tools, usually made of steel, are electrically conductive. These tools present a shock hazard and can cause sparks and arcing. This can ignite battery gasses (hydrogen and oxygen) and cause lethal explosions.

Yet another aspect of conventional batteries is that they are not easily stacked, i.e., vertically ganged. In some types of installations, vertical ganging makes better use of available space than horizontal ganging.

An improved battery connection apparatus which addresses and resolves shortcomings of conventional battery interconnection cables would be a significant advance in the art.

OBJECTS OF THE INVENTION

It is an object of the invention to provide a battery connection apparatus overcoming some of the problems and shortcomings of the prior art.

Another object of the invention is to provide a battery connection apparatus which may be installed without tools or with minimal use of tools.

Another object of the invention is to provide a battery connection apparatus which permits very close horizontal or vertical ganging of batteries.

Still another object of the invention is to provide a battery connection apparatus which reduces the number of joints in a battery interconnection.

Another object of the invention is to provide a battery connection apparatus which helps reduce corrosion at the interconnection points.

Yet another object of the invention is to provide a battery connection apparatus which minimizes or eliminates exposured metal parts which present a potentially lethal shock hazard.

Another object of the invention is to provide a battery connection apparatus which helps reduce the cost of battery interconnection. How these and other objects are accomplished will become apparent from the following descriptions and from the drawings.

SUMMARY OF THE INVENTION

The invention involves a novel battery connection apparatus which includes a terminal member on a battery and a connector member coupled to the terminal member. The members extend along an axis and are configured and arranged so that they resiliently "snap-fit" to one another.

Such apparatus employs what may be termed a "ball-and-socket" arrangement in which a male portion snap-fits into a female portion. Resiliency is provided by "springy" split finger pieces or by a compressed resilient core-like component.

In one highly preferred embodiment, the female terminal member has an interior cavity and the male connector member is received in the cavity. The connector member includes a plurality of finger members which are urged radially outward from the axis when the terminal and connector members are attached to one another. Such "outward urging" is accomplished in one of two most preferred ways.

In one arrangement, the connector member has an interior region and the finger members are urged radially outward by a resilient core in the region. In another arrangement, the finger members include a material having "shape memory." While the connector member is being inserted into the terminal member cavity, the finger members are bent slightly by a deforming force. When such force is reduced (as it is when the connector member is fully inserted), the finger members return toward but not entirely to the shape they had in their repose positions. That is, when the connector is fully inserted into the terminal member cavity, the finger members are still somewhat bent and are urged radially outward.

As to further details of the latter arrangement using "springy", the connector has first and second ends and a mid-portion between the ends. A first groove extends from the first end toward the mid-portion and a second groove extends from the second end toward the mid-portion. The grooves divide each end of the connector into finger members.

In a highly preferred arrangement using a relatively-short connector (so that ganged batteries may be mounted closely to one another), the first and second grooves are circumferentially offset from and in overlapping relationship to one another. In that way, each finger member may be longer (to the root of the groove) than one-half the length of the connector. Longer finger members have more resiliency and can deflect farther without exceeding their elastic limits.

To effect good "large-area" electrical contact, the cavity and the connector member are congruently-shaped. While there are a variety of shape choices available, wedge or cylindrical, for example, a preferred shape is bulbous and a most preferred shape is spherical.

The apparatus may also be configured in an "inside-out" arrangement. That is, the connector member has the interior cavity and the terminal member is received in the cavity. In such arrangement, the connector member includes a plurality of finger members urged radially inward from the axis. As with the arrangement described above, the finger members preferably include a material having shape memory and the cavity and the terminal member are preferably congruently-shaped.

Another aspect of the invention involves an assembly having a pair of batteries coupled together by a connection apparatus. Such apparatus includes a terminal on each battery and a connector extending between the terminals. In the improvement, the terminals and the connector are coincident with an axis and are in opposed facing relationship to one another. The apparatus includes a component stressed radially to the axis, i.e., urged radially toward or away from the axis, for retaining the connector and the terminals in current-carrying contact with one another.

In a more specific embodiment, the component comprises a plurality of finger members which are urged radially outward from the axis. Such outward-urging may be accomplished in either of the ways mentioned above.

The invention includes an optional feature which helps exclude moisture and dirt from the connection apparatus and which helps prevent the user from inadvertently touching live electrical parts. Each battery includes a wall in opposed facing relationship to the wall of the other battery and there is an annular, disc-like insulator interposed between such battery walls and sealing against them. In one of the embodiments described below, the insulator also holds the pieces of the connector member together.

Using the new apparatus, batteries may be gang-connected horizontally or vertically and, essentially, without the use of tools. Other details of the invention are set forth in the following detailed description and in the drawings.

BRIEF DESCRIPTION OF THE DRAWINGS

FIG. 1 is a side elevation view of a group of horizontally-ganged batteries connected together using the inventive apparatus.

FIG. 4 is a side elevation view, partly in section, showing the spaced components of one embodiment of the new apparatus.

FIG. 5 is a side elevation view, partly in section, showing the components of FIG. 4 attached to one another.

FIG. 6A is a view of a segment used to make the connector member portion of the apparatus.

FIG. 6B is a section view of the segment of FIG. 6A taken along the viewing plane 6B—6B thereof.

FIG. 9 is a side elevation view of a fully-assembled connector member made using the components shown in FIG. 7 (with appropriate core trimming) or using the components shown in FIG. 8. An optional washer-like insulator is mounted on the connector member.

FIG. 10A is an end view of yet another type of resilient core.

FIG. 10B is a section view generally like that of FIG. 6B and showing a segment configured for use with the core of FIG. 10A.

FIG. 11A is a side elevation view showing another embodiment of a connector member.

FIG. 11B is an end view of the connector member of FIG. 11A taken along the viewing plane 11B—11B thereof.

FIG. 11C is an end view of the connector member of FIG. 11A taken along the viewing plane 11C—11C thereof.

FIG. 12 is a side elevation view of the connector member of FIG. 11A including an optional washer-like insulator.

FIG. 13A is a side elevation view, in section and with parts broken away, showing another arrangement for holding the connector member and terminal member in contact with one another.

FIG. 13B is a perspective view of one type of hardware used in the arrangement of FIG. 13A.

DETAILED DESCRIPTIONS OF PREFERRED EMBODIMENTS

Figure 2:
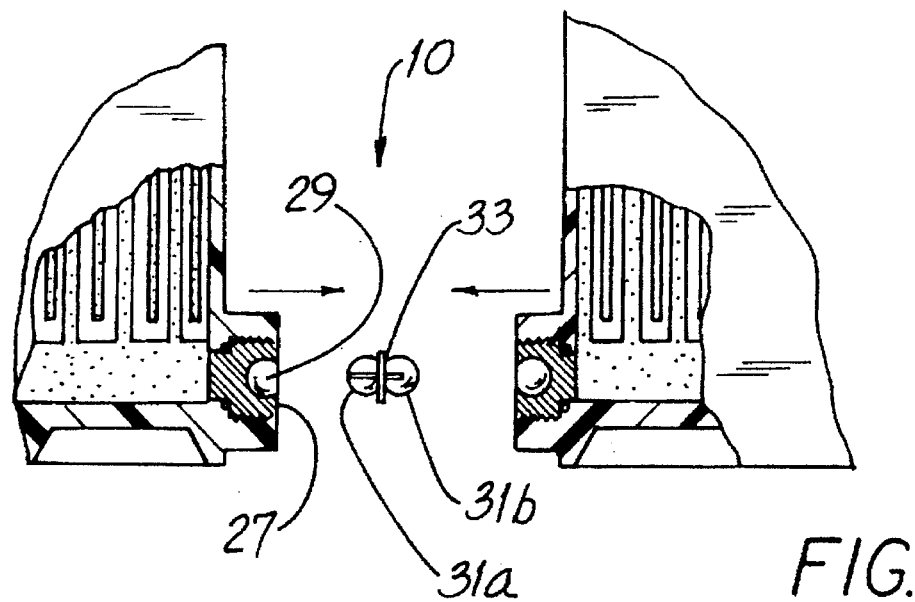
FIG. 2 is a side elevation view, partly in section, of the connection apparatus shown in conjunction with two spaced-apart batteries.
Figure 3:
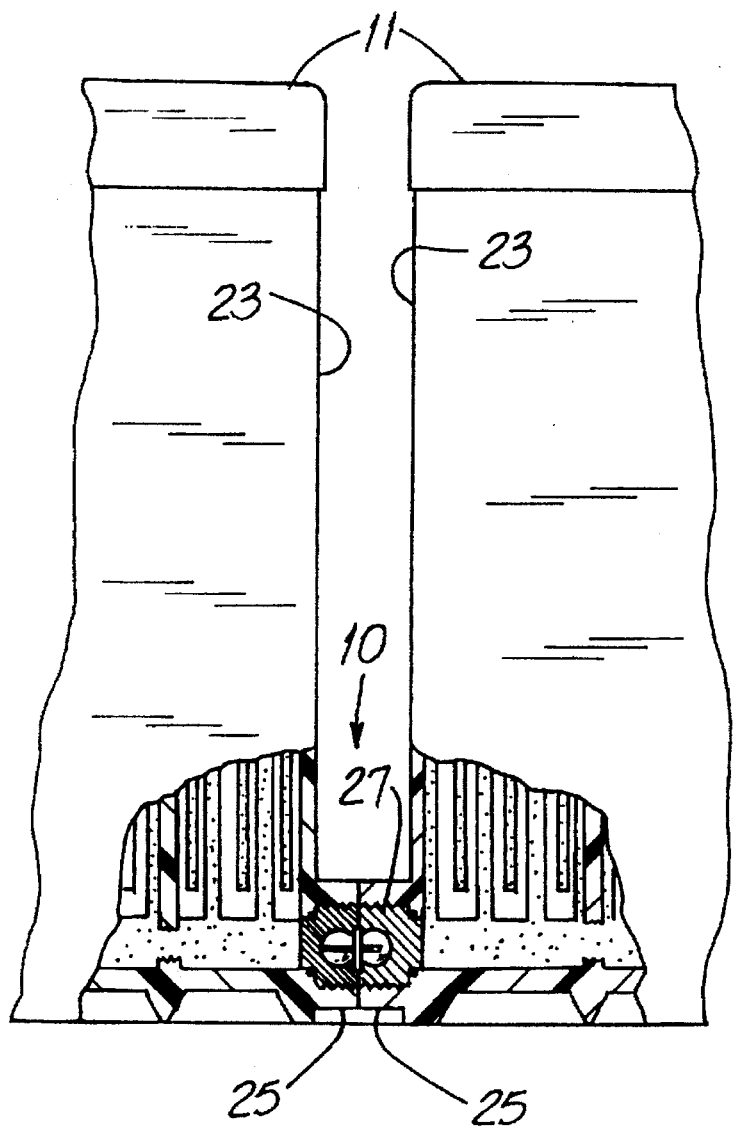
FIG. 3 is a side elevation view, partly in section, of the connection apparatus shown in conjunction with two batteries connected thereby.

Understanding of the new connection apparatus 10 will be aided by a brief explanation of how such apparatus 10 may be used. FIG. 1 shows a group of horizontally-ganged batteries 11 connected to one another in series using the apparatus 10. The battery 11c has its positive terminal 13 connected to the negative terminal 15 of the battery 11b while the positive terminal 13 of the battery 11b is connected to the negative terminal 15 of the next battery 11a and so on. The negative and positive end terminals 17 and 19, respectively, are each connected by a flexible cable 21 to an electric motor, a controller or the like.

Referring next to FIGS. 2 through 5, FIGS. 2 and 3 show how two batteries 11 are connected to one another. In the illustrated embodiment, each battery 11 has a wall 23 in opposed facing relationship to a wall 23 of the other battery 11. An annular boss 25 protrudes from each wall 23 and such boss 25 is conveniently and preferably molded of the same insulating material used to made the battery wall 23.

Threaded to each boss 25 is a terminal member 27 having an interior cavity 29 into which is fitted one end 31a or 31b of the connector member 33. In one embodiment, the connector member 33 is equipped with an annular collar-like insulator 35. When the connector member 33 is in place and the batteries fully connected as in FIG. 3, the insulator 35 helps prevent moisture and dirt from migrating to the apparatus 10 and helps prevent a person from inadvertently inserting a knife edge or similar tool between the bosses 25 and contacting the connector member 33. For reasons that will become apparent, such insulator 35 is preferably made of a resilient material.

Figure 7:
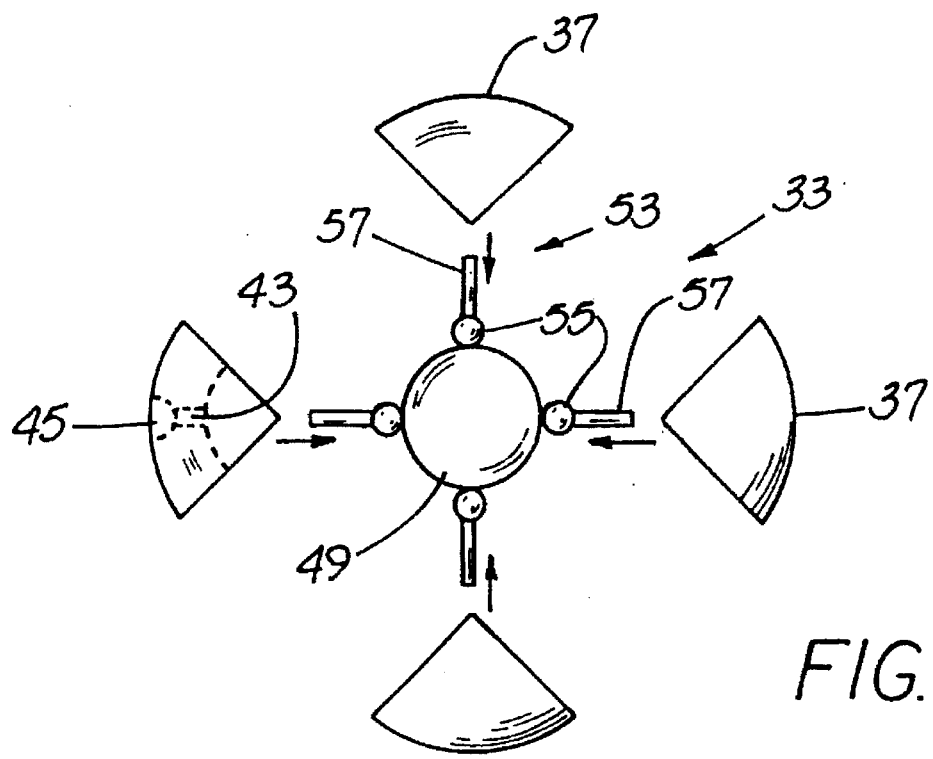
FIG. 7 is an exploded end view of a connector member made using one type of resilient core and segments like that shown in FIGS. 6A and 6B.

Referring next to FIGS. 6A, 6B and 7, one embodiment of the connector member 33 will now be described. Such connector member 33 includes a plurality of segments 37 which, in end view as in FIG. 7, are generally V-shaped. Each segment 37 has a mid-portion 39 and a pair of finger members 41 extending away from such portion 39. And each finger member 41 has a radial hole 43 terminated by a spherical pocket 45; the purposes of the hole 43 and the pocket 45 are described below.

The segments 37 are formed so that when they are assembled as in FIG. 4, for example, they define an interior region 47. A resilient core 49 is "captured" in the region 47 and when an end 31 of the connector member 33 is being inserted into the cavity 29 of a terminal member 27 and when such end 31 is fully fitted into such cavity 29, the core 49 is compressed and urges the finger members 41 radially outward from the axis 51 along which the members 41 extend.

In the embodiment of FIG. 7, the core 49 includes a plurality of radially-outwardly extending arms 53, each having a bulb 55 and a grasping portion 57. To assemble a segment 37 to the core 49, a grasping portion 57 is inserted through a hole 43 and a pocket 45 and is thereupon grasped and pulled. The arm 53 is stretched, the bulb 55 is temporarily diminished in size and moves through the hole 43 and into the pocket 45. When the grasping portion 57 is released, the bulb 55 returns to substantially normal size and the core 49 and a segment 37 are held to one another.

Figure 8:
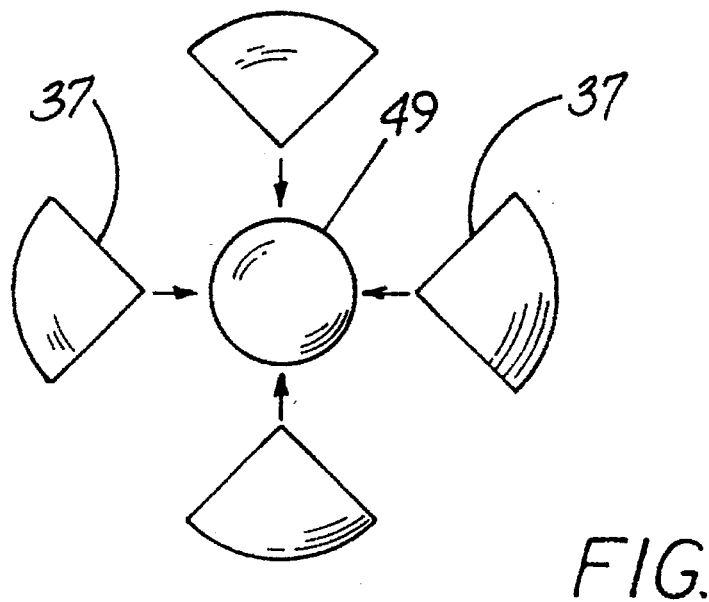
FIG. 8 is an exploded end view of a connector member made using another type of resilient core and segments like that shown in FIGS. 6A and 6B.

In another embodiment shown in FIGS. 8 and 9, the core 49 is free of arms 53 and the segments 37 are assembled around the core 49 and held there by the annular insulator 35. The insulator 35 has a hole 59 therethrough which is of a diameter to snugly fit around the segment mid-portions 39 when the segments 37 are assembled to the core 49. And being resilient, the insulator 35 enlarges to permit an end 31 of the connector member 33 to be pushed through the insulator hole 59.

In yet another embodiment shown in FIGS. 10A and 10B, the resilient core 49 has projections 61 which in a four-segment connector member 33, are spaced about 90° apart. Each companion segment 37 has a pocket 63 into which a projection 61 is forced for retention of such segment 37 on the core 49.

Referring next to FIGS. 11A, 11B and 11C, another embodiment of the connector member 33 will now be described. This embodiment is made of a somewhat "springy" material having shape memory to urge the finger members 41 radially with respect to the axis 51. Materials acceptable for making the member 33 include brass and bronze.

In the illustrated embodiment, the first end 31a has at least one first groove 65 (and, preferably, a pair of first grooves 65) extending from the first end 31a toward the mid-portion 39. Similarly, the second end 31b has at least one second groove 67 (and, preferably, a pair of second grooves 67) extending from the second end 31b toward the mid-portion 39. When the member 33 is urged into a terminal member 27, each resulting finger member 41 bends slightly radially inward.

And since a longer finger member 41 permits greater deflection without exceeding the elastic limit of the material, it is preferred that the first and second grooves 65, 67 are in overlapping relationship to one another as shown in FIGS. 11A and 12. That is, each groove 65, 67 extends from an end 31a, 31b past the mid-portion 39. It is to be appreciated that the first grooves 65 are at 90° to one another and 45° from the second grooves 67. Such offsetting of groove "sets" makes possible longer finger members 41 without extending the length of the connector member 33. As shown in FIG. 12, the insulator 35 may be used with the illustrated connector member 33 but is not needed to hold segments 37 in place since the member 33 is one piece.

An advantage of the arrangements shown in FIGS. 11A–C, 12 and 16 over those of FIGS. 4, 6A–C, 7 and 8 is that in the former, finger members 41 at one end of the connector member 33 can compress toward one another without "spreading" the finger members 41 at the other end. In the arrangements of FIGS. 4, 6A–C, 7 and 8, compressing those finger members 41 at one end of the connector member 33 toward one another spreads the members 41 at the other end away from one another since the segments 37 are rigid.

Figure 14:
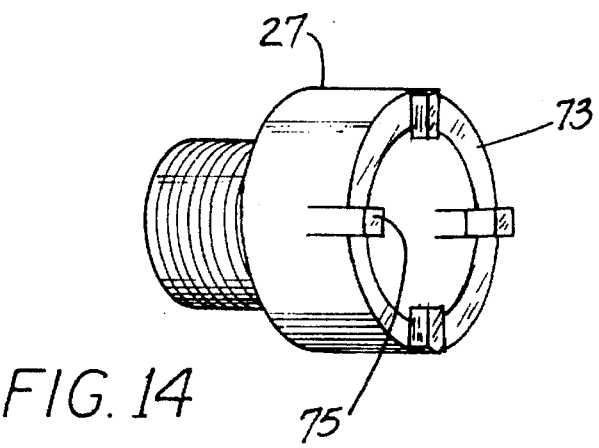
FIG. 14 is a perspective view of another type of hardware used in the arrangement of FIG. 13A.

Referring next to FIGS. 13A, 13B and 14, resilient cores 49 and/or "spring-like" finger members 41 are not the only ways in which a connector member 33 and a terminal member 27 may be held in secure contact with one another. The embodiment of FIGS. 13A and 13B includes a ring 69 having resilient tangs 71 urging the connector member 33 into tight contact with the terminal member 27. The version of FIG. 14 is similar and involves a face 73 with resilient, ledge-like projections 75.

Figure 15:
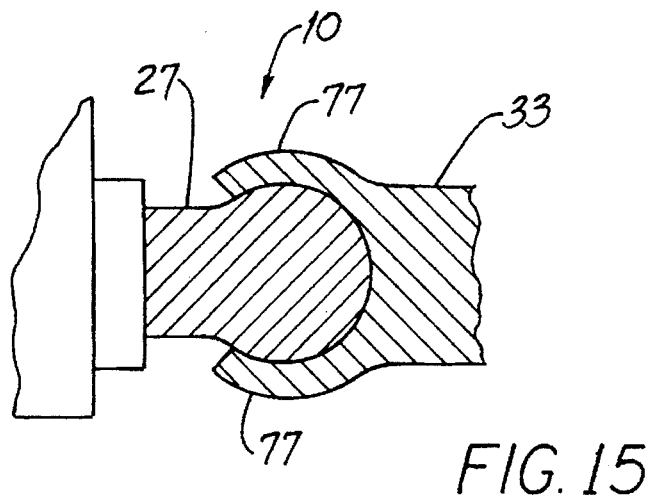
FIG. 15 is a side elevation view, partly in section, showing another embodiment of the new connection apparatus.

FIG. 15 illustrates what may be termed an "inside-out" version of the new connection apparatus 10. The terminal member 27 is male and the connector member 33 is female. Preferably, the terminal member 27 is a solid sphere and the connector member 33 has spring-like finger members 77 for secure electrical contact.

Figure 16B:
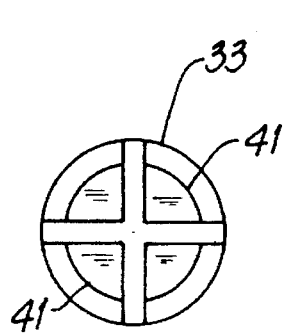
FIG. 16B is an end view of the connector member of FIG. 16A taken along the viewing plane 16B—16B thereof.
Figure 16A:
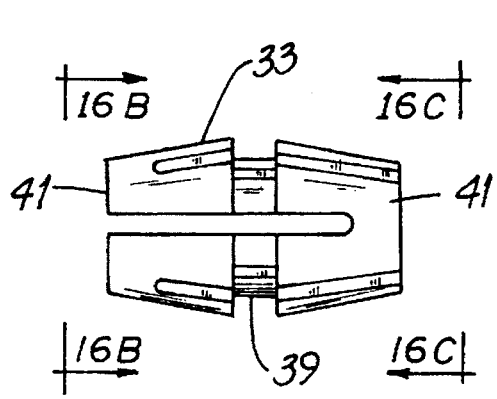
FIG. 16A is a side elevation view of yet another embodiment of a connector member used in the invention.
Figure 16C:
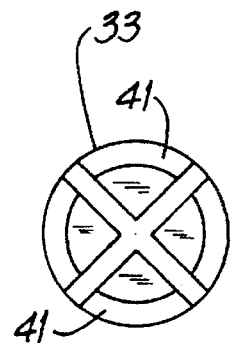
FIG. 16C is an end view of the connector member of FIG. 16A taken along the viewing plane 16C—16C thereof.

Whatever the specific details of construction of the terminal member 27 and the connector member 33, i.e., male or female connector member 33 and resilient core 49 or spring-like finger members 41, the highly preferred embodiments have male and female portions which are generally spherical. But other shapes are possible and FIGS. 16A, 16B and 16C show a connector member 33 having a wedge-like shape resembling that of a truncated cone. Such connector member 33 need not have spring-like finger members to achieve good electrical connection since it can be wedged into the female terminal member 27. However, the illustrated "split" configuration is preferred in that it is somewhat more forgiving as to relative terminal member/connector member position and still provide good contact.

Figure 17:
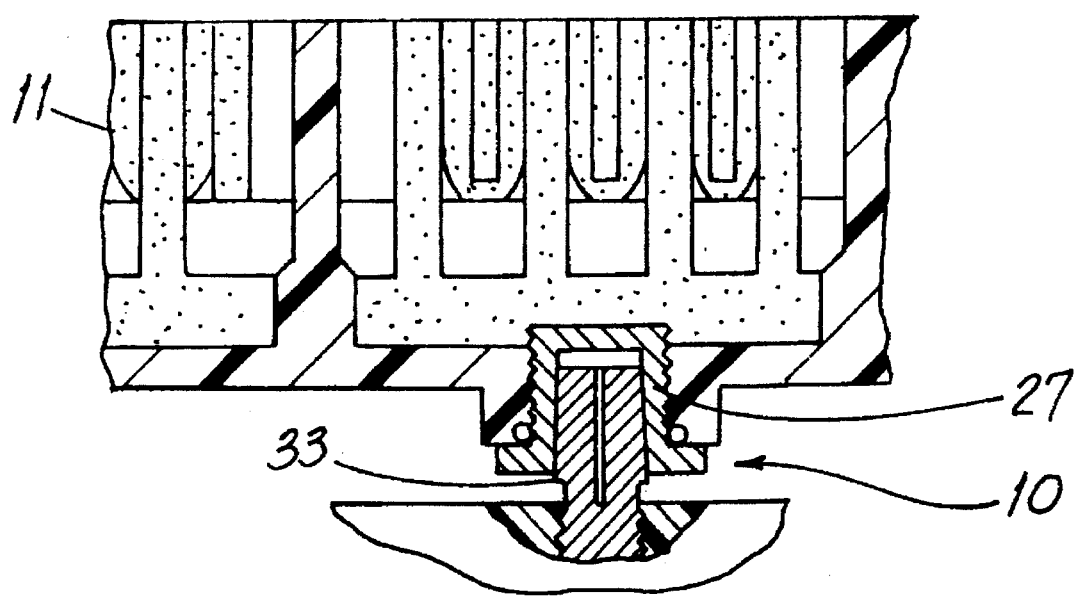
FIG. 17 is a side elevation view in section showing how batteries may be vertically-ganged together using the new apparatus.

FIG. 17 illustrates how the new connection apparatus 10 may be used to vertically-gang batteries 11. The apparatus 10 includes the connector member 33 of FIGS. 16A–16C but, of course, it will be apparent after appreciating this specification that other configurations may be used.

The new connection apparatus 10 is particularly suited for use with the battery and method which are the subject of U.S. Pat. No. 5,318,864 (Shannon et al.).

While the principles of the invention have been shown and described in connection with a few specific embodiments, it is to be understood clearly that such embodiments are by way of example and are not limiting.

What is claimed:

1. A battery connection apparatus including:

a terminal member on a battery;

a connector member coupled to the terminal member, and wherein:

the connector member and the terminal member extend along an axis;

the connector member has plural grooves angularly oriented to one another and dividing such connector member into plural finger members;

the finger members are urged radially outwardly from the axis in at least three different directions;

the connector member has an interior region;

the finger members are urged radially outwardly by a resilient core in the region;

when separated from one another, the terminal member and the connector member are conformably-shaped; and when the terminal member and the connector member are coupled to one another, the connector member is resiliently snap-fitted to the terminal member.

2. The apparatus of claim 1 wherein:

the terminal member protrudes from the battery and is received in the region.

3. In an assembly having a pair of batteries coupled together by a connection apparatus including (a) a terminal member on each battery, and (b) a connector member extending between the terminal members, the improvement wherein:

the connector member has an interior region;

the terminal members and the connector member are coincident with an axis;

the terminal members are in opposed facing relationship to one another;

the apparatus includes a resilient core in the region and stressed radially to the axis for retaining the connector member and the terminal members in current-carrying contact with one another;

each terminal member defines a shape other than cylindrical;

the connector member has first and second ends, each defining the same shape which is other than cylindrical; and when separated from one another, the terminal members and the ends of the connector member are comformably-shaped.

4. The assembly of claim 3 wherein:

each battery includes a wall in opposed facing relationship to the wall of the other battery; and the apparatus includes an insulator around the connector member and between the battery walls, whereby inadvertent contact with the connector is substantially prevented.

5. The assembly of claim 3 wherein:

the terminal members are first and second terminal members;

the connector member has first and second ends and a mid-portion between the ends;

a first groove extends from the first end toward the mid-portion; and a second groove intersects the first groove and extends from the second end toward the mid-portion.

6. The assembly of claim 5 wherein the first and second grooves, are substantially normal to one another.

* * * * *